350-384 SR
XR 3,354,465
CROSS REFERENCE
SEARCH ROOM

Nov. 21, 1967 C. H. MERRITT ET AL 3,354,465

CONSTANT DENSITY OSCILLOGRAPH TRACE

Filed Oct. 22, 1965 2 Sheets-Sheet 1

INVENTOR.
CHARLES H. MERRITT
BY JOHN H. BENNETT
Christie, Parker & Hale
ATTORNEYS.

INVENTORS.
CHARLES H. MERRITT
BY JOHN H. BENNETT
Christie, Parker + Hale
ATTORNEYS.

United States Patent Office 3,354,465

Patented Nov. 21, 1967

3,354,465

CONSTANT DENSITY OSCILLOGRAPH TRACE

Charles H. Merritt, Altadena, and John H. Bennett, Granada Hills., Calif., assignors to Consolidated Electrodynamics Corporation, Pasadena, Calif., a corporation of California

Filed Oct. 22, 1965, Ser. No. 501,161
2 Claims. (Cl. 346—109)

ABSTRACT OF THE DISCLOSURE

An optical recording device in which a beam of light is directed to a moving photosensitive recording medium for recording information carried in an input signal applied to the device, the input signal being applied to a beam modulating mechanism so that the image recorded on the medium embodies the information carried in the input signal. The modulating mechanism includes a Kerr Cell disposed across the beam between a light polarizer and a polarized light analyzer, the Kerr Cell being driven by the output of a filter circuit which passes the input signal to the extent that the rate of change of the input signal exceeds a selected rate of change corresponding to the tuned frequency of the filter.

This invention relates to recording oscillographs and, more particularly, to such a device including a mechanism for regulating the intensity of a light beam which is moved across a photosensitive recording medium in response to variations in an input signal to the oscillograph so that the developed trace of the light beam upon the medium has a substantially uniform density.

The intensity of the trace on an oscillograph record is normally proportional to the intensity of the exposing light source and the duration of exposure. The duration of exposure in turn is a function of the frequency of the signal recorded, i.e., the rate at which the galvanometer mirror is caused to sweep the light beam across the paper.

In existing oscillographs, the intensity of the light source is selected so that the illumination of the medium for low and intermediate frequency input signals produces proper exposure of the photosensitive medium. At higher input signal frequencies, however, the illumination of the medium by the moving light beam is often insufficient to properly expose the photosensitive surface of the medium. As a result, the developed trace of the path of the light beam across the medium varies in intensity. Variations in the intensity of the recorded trace produce problems in accurately and intelligently interpreting the information recorded upon the medium.

This invention provides a mechanism for improving the uniformity of the density of the trace recorded upon the photosensitive medium of a recording oscillograph. This mechanism is simple and lends itself readily to incorporation into single or multi-channel oscillographs. Use of the mechanism assures more optimum exposure of the medium over a wider range of input signal frequencies than has heretofore been possible.

Generally speaking, this invention is provided in combination with a recording oscillograph. A conventional oscillograph includes means for moving a light sensitive recording medium along a predetermined path, a source of light radiation and means for directing a beam of the light radiation along a selected path incident upon the moving medium. Accordingly, there is recorded on the medium an image of the beam. The oscillograph also includes a mechanism responsive to variations in an input signal applied to the oscillograph to deflect the beam transversely of the path of movement of the medium so that the recorded image forms a record of variations in the value in the input signal. In such a recording oscillograph, this invention contemplates the provision of modulating means to which the input signal is applied for varying the amount of light transmitted to the medium from the light source in proportion to the rate at which the beam moves transversely of the direction of movement of the medium. The modulating means is responsive to variations in the value of the input signal. Accordingly, the amount of light transmitted to the medium is proportional to the rate of movement of the beam image across the medium. Thus, the developed image of the beam recorded upon the medium has substantially uniform density.

The above mentioned end other features of the present invention are more fully set forth in the following detailed description of the invention, which description is presented in conjunction with the accompanying drawings, wherein.

Figure 1:
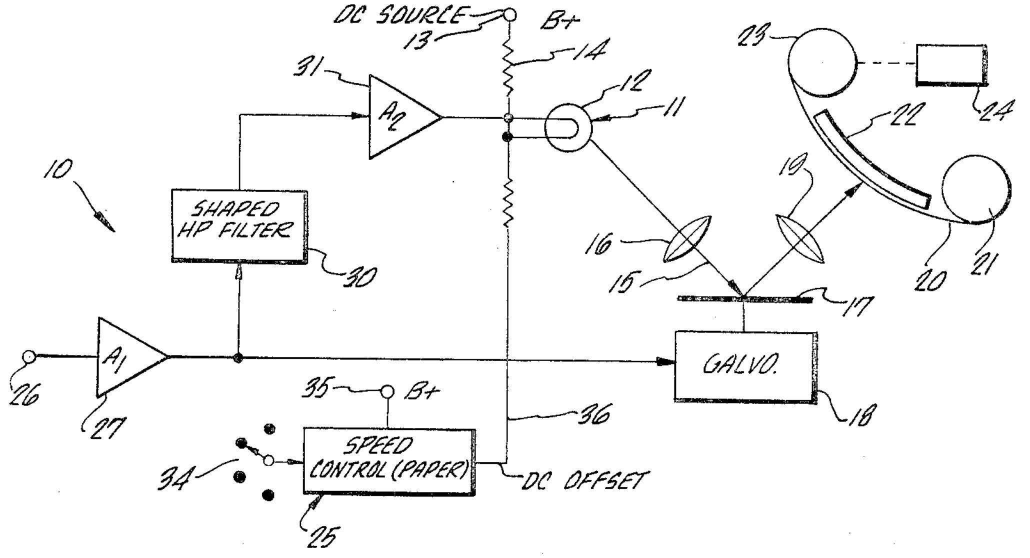
FIG. 1 is a schematic diagram of a recording oscillograph including a light modulating mechanism according to this invention.

A recording oscillograph 10, as shown schematically in FIG. 1, includes a source 11 of light radiation. The source may comprise an incandescent lamp 12. Mercury vapor and other gas discharge sources are also used. The lamp is energized by DC power applied to the lamp filament from a B+ input terminal 13 via a resistor 14. Light from the lamp is formed into a beam of light 15 by a collimating and focusing lens 16 and directed to a mirror 17 of a galvanometer 18. The beam, as reflected from the galvanometer mirror, passes through an objective lens 19 into incidence upon a photosensitive surface of a recording medium 20. The medium preferably is a strip of paper, one side of which is treated to be light sensitive. Recording papers of this type are well known and form no part of the present invention. As the medium is exposed to light beam 15, there is recorded thereon a latent image of the beam. The latent image is normally developed or latensified by conventional procedures to produce a visible image of the trace, i.e., the path of the beam over the medium.

The photosensitive medium is passed from a supply station 21 in the oscillograph over a platen 22 to a take-up roller 23 driven by a motor 24. The medium is moved along a predetermined path from the supply station to the take-up roller at a selected speed determined by the setting of a speed control device 25.

The oscillograph also includes an input terminal 26 to which is applied an input signal. A representation of the variations in the value of the oscillograph input signal is to be recorded upon the medium. The input signal is applied from terminal 26 to the galvanometer via an input signal amplifier 27. When the input signal has a zero or "no signal" value, the trace of beam 15 on the moving recording medium defines a straight line parallel to the direction of medium movement through the oscillograph. When the value of the input signal varies from a "no signal" value, galvanometer mirror 17 is deflected proportionally. Accordingly, the light spot defined by the incidence of beam 15 on the moving medium is moved transversely of the direction of medium movement an amount proportional to the difference between the instantaneous value of the input signal and the "no signal"

value of the signal. In this manner a representation of variations in the value of the input signal is recorded upon medium 20.

For the purposes of example, let it be assumed that the input signal varies in value sinusoidally. The speed at which the light spot moves across the surface of the recording medium is least at the peaks of the sine waves. Normally, the peaks of the sine wave recorded on the medium are of greatest interest. Therefore, in existing oscillographs, intensity of the light source, and therefore also of the light beam at the medium, is selected so that the medium is not overexposed at these portions of the trace. Between the peaks of the sine wave, he light spot moves fastest. If the intensity of the light in the light spot is held constant, as is the present practice, the medium will be underexposed between the peaks of the recorded sine wave trace, particularly in the area midway between the peaks of the trace. Very often the shape of the trace midway between the trade peaks is of interest, but the information in this portion of the recorded trace cannot be discerned because the trace density in this area is too low to enable accurate interpretation of the trace.

Pursuant to this invention, oscillograph 10 is equipped with a mechanism for modulating the intensity of the light beam at the recording medium so that a trace of more uniform density is provided on the recording medium irrespective of rate of travel of the recorded light beam. As shown in FIG. 1, a shaped high-pass filter 30 is coupled between the output of input signal amplifier 27 and light source 11. A filter output amplifier 31 is connected between the filter and the light source. The filter is constructed to be responsive to the rate of change of the value of the input signal. The filter includes a frequency responsive limiter effective to block the input signal from amplifier 31 when the input signal is of low amplitude and has a frequency less than the tuned frequency of the filter. Further, the filter 30 is constructed so that the curve of its output versus input signal frequency matches as closely as possible the curve of light spot intensity versus light spot velocity for optimum density of the developed trace recorded by the light spot upon medium 20. In other words, the filter is constructed so that, when the input signal varies in a manner productive of a light spot velocity across the surface of the light-sensitive medium which is greater than a selected velocity, the filter passes the input signal to amplifier 31 in a degree proportional to the difference between the actual light spot velocity and the selected light spot velocity. The output of the filter, therefore, is proportional to the rate of change of the value of the input signal.

The portion of the input signal passed by the filter is amplified by amplifier 31 and applied to the light source to supplement the steady-state light source energization signal applied at terminal 13. Accordingly, the energization of the light source, and thereby the intensity of the illumination of medium 20 by beam 15, is modulated proportional to the beam writing speed, i.e., proportional to the velocity of the light spot over the surface of the photosensitive medium. Thus, the exposure of the medium is more uniform along the path of the light spot, and the developed trace is of more uniform density than the trace produced by an oscillograph not incorporating this invention.

Speed control device 25 includes a speed selector switch 34. The setting of the switch determines the speed at which motor 24 is effective to move the light sensitive recording medium through the oscillograph; for this purpose the paper speed control device is coupled to the paper drive mechanism by means not shown. Also, the paper speed control device includes a B+ input terminal 35 and a voltage divider network (not shown) having an output applied via a conductor 36 to light source 11. Operation of switch 35 determines the output of the voltage divider network and thereby determines the extent to which the steady-state energization of the light source is varied in response to changes in the speed at which the recording medium is moved through the oscillograph.

The structure shown in FIG. 1 is especially useful in single-channel recording oscillographs. A single-channel oscillograph contains only one galvanometer and can accept only one input signal. Also, the structure shown in FIG. 1 is adapted for use in relatively low frequency oscillographs since an incandescent lamp is relatively insensitive to high frequency variations in its energization.

Figure 2:
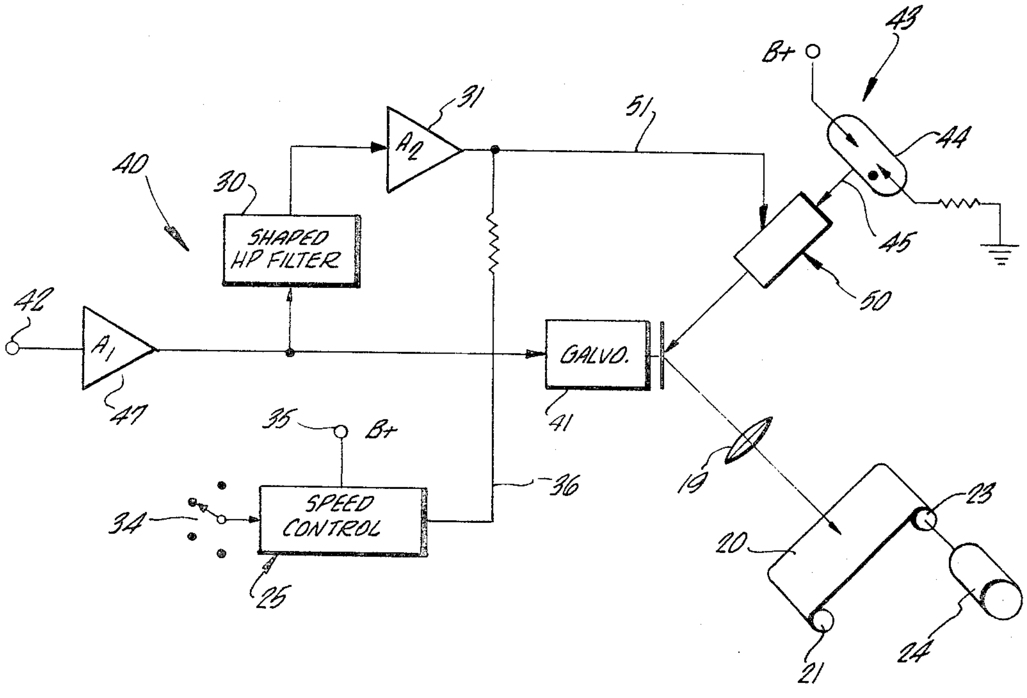
FIG. 2 is a schematic diagram of another oscillograph equipped with a light modulating mechanism according to this invention.

FIG. 2 shows a high-frequency multi-channel recording oscillograph 40 incorporating, in each channel, structure according to this invention. The oscillograph includes a plurality of galvanometers 41 and a corresponding plurality of input terminals 42 to which oscillograph input signals may be applied. Only one channel of the oscillograph is shown in FIG. 2, however, since each channel is identical. The oscillograph includes a supply station 21 for a roll of light-sensitive recording paper 20 and a take-up roller 23 spaced from the paper supply station along a predetermined path of paper movement through the oscillograph. The take-up roll is driven by a motor 24. The speed at which the motor drives the take-up roll is determined by the setting of a speed control device 25.

A light source 43, preferably in the form of a mercury or xenon arc lamp 44, is provided common to all the channels of the oscillograph. A beam of light 45 is directed from the light source to a movable mirror 46 incorporated into each galvanometer for reflection and deflection by the mirror to the light-sensitive surface of recording medium 20. Each galvanometer mirror is mounted for deflecting the beam reflected by it transversely of the direction of medium movement in response to variations in the value of an input signal applied to the galvanometer from a corresponding input terminal 42 via an input signal amplifier 47.

Between the light source and the recording medium, each light beam 45 passes through a polarizing light valve 50. Also, each channel of oscillograph 40 includes a shaped high-pass filter 30 and a filter output amplifier 31 coupled in series between the output of amplifier 47 and the light valve for that channel; each filter-amplifier combination is in accord with the foregoing description. Also, the paper speed control device 25 for the oscillograph has its output conductor 36 connected to a conductor 51 by which the output of each amplifier 31 is applied to the corresponding light valve so that the steady-state bias of all light valves in the oscillograph is varied in response to a change in the setting of speed selector switch 34.

Eight light valve is operated in response to the output of the corresponding filter output amplifier to modulate the amount of light present in the beam passed therethrough in response to the instantaneous velocity of the light spot transversely of the direction of movement of the medium. Accordingly, the developed trace or image of the path of each light spot over the medium is of substantially constant density.

Figure 3:
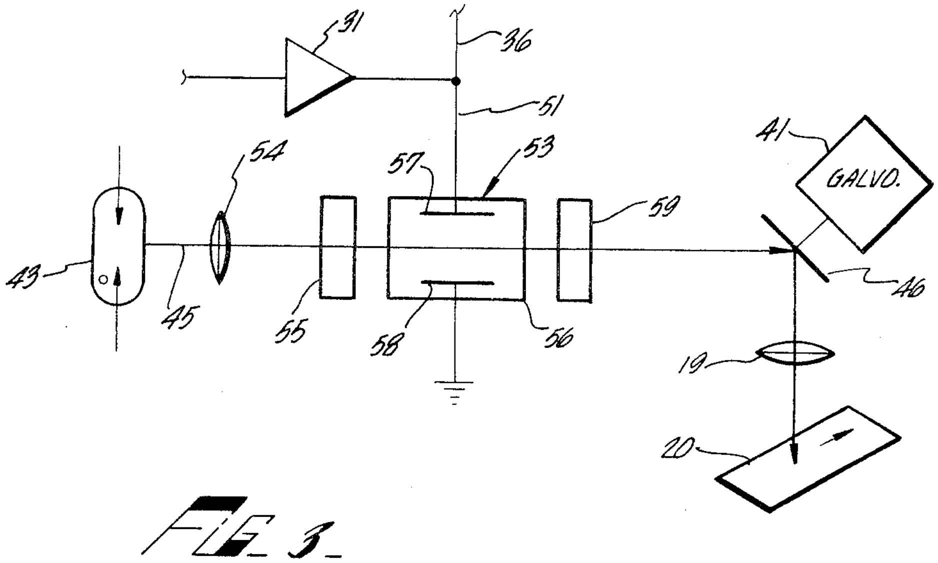
FIG. 3 is a schematic diagram of a light valve for use in the oscillograph shown in FIG. 2.

As shown in FIG. 3, light valve 50 includes a Kerr Cell 53. (The Kerr Effect is described at pages 6–117, Handbook of Physics, edited by Condon and Odishaw, McGraw-Hill Book Company, Inc., 1958.) Each light beam 45 from the light source is passed through a collimating lens 54 and a light polarizer 55 to the corresponding Kerr Cell. The Kerr Cell includes a quantity of an isotropic transparent material which may be a gas, a solid or a liquid, as desired. Where the isotropic transparent material is a gas or a liquid, the Kerr Cell includes a transparent housing 56. The cell also includes a pair of spaced electrodes 57, 58 subjecting the isotropic material to an electric field. The output of the corresponding filter output amplifier is applied to electrode 57, electrode 58 is connected to ground. The isotropic material is rendered doubly refracting in the presence of an electric field, and the extent to which the material is rendered doubly refracting is related to the value of the potential impressed across the cell electrodes.

Light beam 45 emerges from the Kerr Cell to pass through a polarized light analyzer 59 and thence to the moving recording medium via objective lens 19 located between the galvanometer mirror and the medium. Preferably, as shown in FIG. 3, the light valve is located between the light source and the mirror.

The Kerr Cell passes a minimum amount of light when no potential is impressed across the cell electrodes. As the potential impressed across the cell electrodes is increased up to a predetermined value dependent upon cell geometry and the specific isotropic material used, the amount of entrant light passed to the analyzer is increased as the isotropic material is increasingly polarized into the optical plane of the analyzer. A further increase in cell energization potential causes a reduction in the amount of light passed to and through the analyzer.

The output of the speed control device, when set at its lowest setting, provides sufficient energization of the Kerr Cell to pass an amount of light to the mirror equal to the amount applied to the mirror in existing oscillographs. Thereafter, the output of amplifier 31 is applied to the cell to further increase the potential impressed across the cell electrodes in response to the signal passed by filter 30. Also, the steady-state energization of the cell is increased by an increase in the output of the speed control device as paper speeds are increased. The maximum potential impressible across the cell is selected to match the potential at which the cell passes the maximum amount of light.

Light valve 50, at frequencies below radio frequencies, responds instantaneously to variations in the potential applied to it and therefore is preferred in the practice of this invention. Recording oscillographs can be built to record time variations in applied input signals up to about 25,000 cycles per second. The useful range of the Kerr Cell, used as a light valve as described, more than spans the frequency range of the oscillograph.

Figure 4:
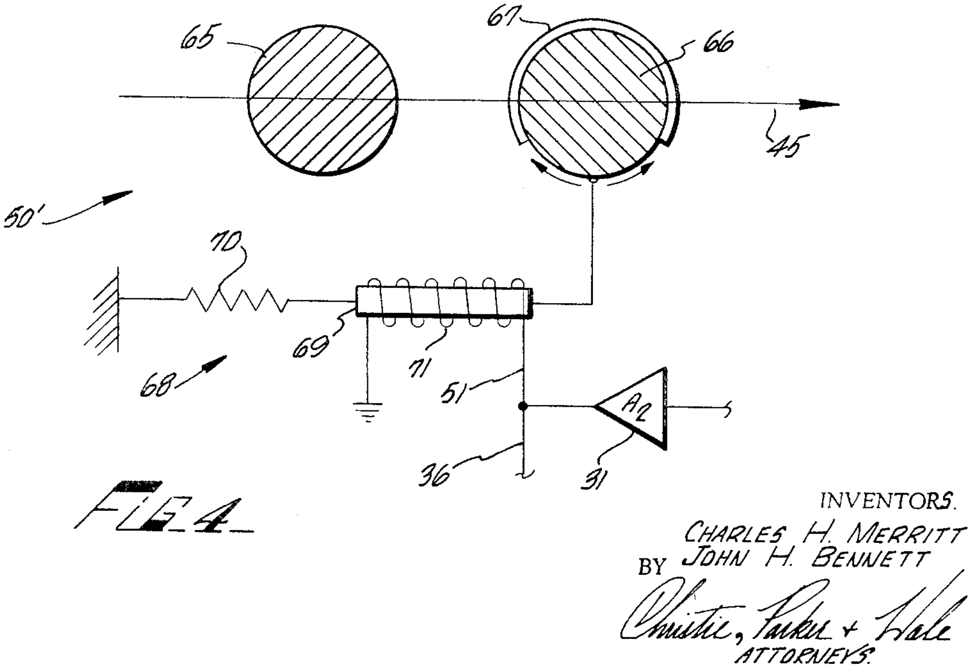
FIG. 4 is a schematic diagram of another light valve for use in the oscillograph shown in FIG. 2.

Another light valve 50′ is shown in FIG. 4 to include a fixed light polarizer 65 disposed across the path of light beam 45 between the light source and the galvanometer mirror in a given channel of multi-channel oscillograph 40. Between the polarizer and the mirror, a polarized light analyzer 66 is disposed across the path of the light beam. The analyzer is circular and is mounted for rotation about an axis substantially coaxial with the light beam in a bearing shoe 67. A solenoid servomechanism 68 is coupled between the paralleled outputs of each amplifier 31 and the record speed control device, as shown in FIG. 4, and the analyzer for indexing the analyzer angularly relative to the polarizer. The servomechanism, therefore, operates in response to the signal applied to it from amplifier 31 and the record speed control device in a manner akin to the operation of light valve 50. The servomechanism includes a magnetic core 69 coupled to the analyzer and biased by a spring 70 into a position corresponding to the minimum quantity of light to be passed to the recording medium. A coil 71 is wound around, but spaced from, the core. One end of the coil is connected to ground and the other end of the coil is connected to conductor 51. Accordingly, increased current flow through the coil causes the analyzer to be indexed about the beam so that a correspondingly increased amount of light is passed by the valve to the recording medium.

It is apparent from the foregoing that this invention provides apparatus for modulating the intensity of illumination in the light spot produced by the intersection of a movable light beam with a moving recording medium in a recording oscillograph. The light intensity is modulated in proportion to the absolute velocity of the spot across the light-sensitive surface of the medium when the spot has a velocity greater than a predetermined velocity. Moreover, such apparatus can be provided for each channel of a multi-channel oscillograph since the structure can be made quite compact. Further, the apparatus is simple, effective and efficient.

What is claimed is:

1. In a recording oscillograph including means for moving a light sensitive recording medium along a predetermined path, a constant intensity source of light radiation, means for directing a beam of the light radiation along a selected path intersecting said predetermined path to record upon a medium moving therealong an image of the beam, and means responsive to variations in an input signal to the oscillograph for deflecting the beam transversely of said predetermined path so that the recorded image forms a record of variations in the value of the input signal, the improvement comprising light modulating means responsive to variations in the input signal for varying the amount of light transmitted along said selected path from the light source to the recording medium in proportion to the rate at which the beam moves transversely of said predetermined path, the light modulating means including a light polarizer disposed across the beam, a polarized light analyzer disposed across the beam opposite the polarizer from the light source, a Kerr Cell disposed across the beam between the polarizer and the analyzer, a filter circuit to which the input signal is applied and constructed so that, when the input signal varies in a manner productive of a velocity of the beam transversely of the direction of medium movement greater than a selected velocity, the filter circuit passes as its output the input signal to an extent proportional to the difference between the instantaneous transverse velocity of the beam and the selected velocity, and means applying the output of the filter circuit to the Kerr Cell for driving the Kerr Cell.

2. Apparatus according to claim 1 including a speed control device operable for varying the speed at which the recording medium is moved along the predetermined path between a plurality of preselected speeds and having an output coupled to the Kerr Cell.

References Cited

UNITED STATES PATENTS

| | | | |
|---|---|---|---|
| 1,746,407 | 2/1930 | Schroter et al. | 346—108 X |
| 2,385,086 | 8/1945 | Agostino et al. | 350—150 X |
| 2,415,800 | 2/1947 | Hassler | 346—109 |
| 2,423,320 | 7/1947 | Hurley | 350—159 X |
| 2,958,010 | 10/1960 | Carter et al. | 346—109 X |
| 3,245,083 | 4/1966 | Wilson et al. | 346—109 |

RICHARD B. WILKINSON, *Primary Examiner.*

J. W. HARTARY, *Assistant Examiner.*